US008053014B2

(12) United States Patent  
Koike et al.

(10) Patent No.: US 8,053,014 B2
(45) Date of Patent: Nov. 8, 2011

(54) LIQUID SEASONING

(75) Inventors: Shin Koike, Tokyo (JP); Koichi Okisaka, Tokyo (JP); Jun Kohori, Tokyo (JP); Yoko Seo, Tokyo (JP); Noboru Shirahata, Tokyo (JP); Hiroyuki Nakayama, Tokyo (JP); Atsushi Suzuki, Tochigi (JP); Ryuji Ochiai, Tochigi (JP)

(73) Assignee: Kao Corporation, Tokyo (JP)

( * ) Notice: Subject to any disclaimer, the term of this patent is extended or adjusted under 35 U.S.C. 154(b) by 577 days.

(21) Appl. No.: 12/093,676

(22) PCT Filed: Nov. 14, 2006

(86) PCT No.: PCT/JP2006/323060
§ 371 (c)(1),
(2), (4) Date: Aug. 15, 2008

(87) PCT Pub. No.: WO2007/055426
PCT Pub. Date: May 18, 2007

(65) Prior Publication Data
US 2009/0098268 A1 Apr. 16, 2009

(30) Foreign Application Priority Data

Nov. 14, 2005 (JP) ................................. 2005-328732
Dec. 2, 2005 (JP) ................................. 2005-348949
Dec. 12, 2005 (JP) ................................. 2005-357097
May 9, 2006 (JP) ................................. 2006-130109
May 9, 2006 (JP) ................................. 2006-130111

(51) Int. Cl.
A23L 1/238 (2006.01)
A23L 1/237 (2006.01)

(52) U.S. Cl. ........................................ 426/589; 426/649
(58) Field of Classification Search ................. 514/732; 424/115; 426/589, 649
See application file for complete search history.

(56) References Cited

U.S. PATENT DOCUMENTS 4,031,265 A 6/1977 Guadagni et al.
4,154,862 A 5/1979 Guadagni et al.
7,510,738 B2 * 3/2009 Goral ............................ 426/650

FOREIGN PATENT DOCUMENTS

| JP | 63-003766 | 1/1988 |
| JP | 3-027293 | 2/1991 |
| JP | 5-115261 | 5/1993 |
| JP | 5-184326 | 7/1993 |
| JP | 6-335362 | 12/1994 |
| JP | 8-256725 | 10/1996 |
| JP | 8-283154 | 10/1996 |
| JP | 9-271351 | 10/1997 |
| JP | 11-318379 | 11/1999 |
| JP | 2000-078955 A | 3/2000 |
| JP | 2000-078956 A | 3/2000 |
| JP | 2000-217540 A | 8/2000 |
| JP | 2000217540 A * | 8/2000 |
| JP | 2000-319154 | 11/2000 |
| JP | 2000-327692 | 11/2000 |
| JP | 2001-078700 | 3/2001 |
| JP | 2001-240539 | 9/2001 |
| JP | 2001-309764 | 11/2001 |
| JP | 2002-047196 | 2/2002 |
| JP | 2002-291441 A | 10/2002 |
| JP | 2002-325554 | 11/2002 |
| JP | 2004-049186 | 2/2004 |
| JP | 2004-89119 | 3/2004 |
| JP | 2004-141014 | 5/2004 |
| JP | 2004-194515 | 7/2004 |
| JP | 2004 194515 | 7/2004 |
| JP | 2004-238336 | 8/2004 |
| JP | 2004-290129 A | 10/2004 |
| JP | 2005-145933 | 6/2005 |
| JP | 2005-168458 | 6/2005 |
| JP | 2005-225847 | 8/2005 |
| JP | 2005-245291 | 9/2005 |
| JP | 2006 141226 | 6/2006 |
| JP | 2006 166752 | 6/2006 |
| JP | 2006 166906 | 6/2006 |
| WO | WO 93/10677 | 6/1993 |
| WO | WO 98/18348 | 5/1998 |

OTHER PUBLICATIONS

The English abstract for JP 2000217540 A (Aug. 2000).*
Kenji Maehashi, et al. "Isolation of Peptides from an Enzymatic Hydrolysate of Food Proteins and Characterization of Their Taste Properties", Biosci. Biotechnol. Biochem, vol. 63, No. 3, 1999, pp. 555-559.
Nutrition an cooking Foods Data <1> "rapid understanding of salt of foods" edited by Joshi Eiyou University, Aug. 1987, p. 111.
Yoichi Nogata, et al., "Flavonoid Composition of Fruit Tissues of Citrus Species" Biosci. Biotechnol. Biochem., vol. 70, No. 1, 2006, pp. 178-192. Research and technique of soy sauce, vol. 31, No. 6, Nov. 2005, p. 406.
Seiko Ota et al., Kourin techno-books 11, Tsuyu's chemical and production, Jul. 25, 1991, p. 288.
Office Action issued Sep. 21, 2010 in Japanese Application No. 2005-357097 (With English Translation).
Office Action issued Sep. 21, 2010 in Japanese Application No. 2004-348949 (With English Translation).
Office Action issued Nov. 24, 2010 in Japan Application No. 2005-348949 (With English Translation).

(Continued)

Primary Examiner — Kevin E Weddington
(74) Attorney, Agent, or Firm — Oblon, Spivak, McClelland, Maier & Neustadt, L.L.P.

(57) ABSTRACT

The present invention is a liquid seasoning containing the following (A), (B), and (C):
(A) 0.4 to 8% by mass of sodium
(B) 0.01 to 4% by mass of flavonoid
(C) 1 to 10% by mass of ethanol
wherein, the flavonoid (B) satisfies the formula (1) and/or has one or more OH groups on the A-ring or B-ring in a molecule and no OH group at the position adjacent to the OH group (ortho position).

$$Y/(X+Y)=0.05 \text{ to } 1 \quad \text{formula (1)}$$

wherein, X and Y represent the following numbers, respectively:
X; the number of OH group bonded to benzene rings in a molecule of the flavonoid,
Y; the number of $OCH_3$ group bonded to benzene rings in a molecule of the flavonoid.

20 Claims, No Drawings

OTHER PUBLICATIONS

Office Action issued Nov. 24, 2010 in Japan Application No. 2005-357097 (With English Translation).
"Functional Plant Food", Chemical Industry Press, Oct. 2004, pp. P197-199.
Office Action issued Mar. 9, 2011, in Chinese Patent Application No. 200680042463.8 (with English translation).
Office Action issued May 24, 2011 in Japanese Patent Application No. 2007-124359 (with English translation).
Office Action issued Aug. 16, 2011, in Chinese Patent Application No. 200680042463.8 (with English translation).
Office Action issued Aug. 23, 2011 in Japanese Patent Application No. 2007-124359 (with English translation).

* cited by examiner

LIQUID SEASONING

FIELD OF THE INVENTION

The present invention relates to a liquid seasoning containing a flavonoid.

BACKGROUND OF THE INVENTION

Saltiness is closely connected to palatability of foods. Sodium and chlorine are essential nutrients for the human body. Common salt therefore plays an important role in seasoning, preservation, and processing of foods, and is one of the essential seasonings in the food industry. However, an excess intake of common salt is thought as a risk factor for high blood pressure and heart disease. An intake of common salt is thus strongly desired to be reduced. Reduction in intake of common salt can be achieved by reducing the content of common salt in food and drink. However, reduction of the content of common salt in food by 10% or more generally results in a bad taste.

Under such circumstances, salty taste-enhancing substances have been proposed, that can enhance the salty taste of common salt and result in satisfactory salty taste with a reduced amount of common salt used. There have been known salty taste-enhancing substances, including, for example, peptides and saturated aliphatic monocarboxylic acids having 3 to 8 carbon atoms (JP-A-63-3766, JP-A-5-184326, Biosci. Biotech. Biochem. 63, 555 (1999)).

There has been also increasing interest in physiological functions of a variety of ingredients contained in foods. Flavonoids are one kind of materials having physiological functions. Flavonoids, which are contained in vegetable foods, are known to have actions such as hypotensive, lipid metabolism improving, and allergy inhibiting actions (JP-A-8-283154, JP-A-2001-240539, JP-A-2002-47196, JP-A-2005-225847).

Flavonoids have useful physiological functions, but also have problems of low solubility in water and of producing abnormal tastes such as bitter, astringent, and harsh tastes. To address these problems, there have been known techniques of enhancing the solubility of flavonoids (JP-A-3-27293, JP-A-2000-327692, JP-A-2004-238336) and of improving tastes derived from flavonoids (JP-A-2001-309764, JP-A-2005-245291, JP-A-2005-145933). Further, techniques of applying flavonoids to foods have been proposed. For example, techniques of applying flavonoids to seasonings have been disclosed (WO 98/18348, JP-A-2000-78955, JP-A-2000-78956, JP-A-2002-291441, JP-A-2004-290129, JP-A-2005-168458). Among flavonoids, flavone, which has many methoxy residues, is known to have actions of reducing the salty taste, suppressing residual sweet taste, and the like. An action of flavonoids to enhance salty taste retention is however not known. For flavonoids, there have been disclosed actions of improving a sweet taste, reducing a strong taste of vegetable juice and an herbal drug, reducing the astringent taste and sour taste, and reducing an unfavorable taste (WO 93/10677, U.S. Pat. No. 4,031,265, U.S. Pat. No. 4,154,862, JP-A-6-335362, JP-A-8-256725, JP-A-11-318379, JP-A-2004-49186).

Liquid seasonings such as Men-tsuyu (a soup for noodles) and Ponzu (sauce that blended soy sauce and vinegar with fruit juice) are produced from soy sauce and Dashi (soup stock) as main raw materials. These have a problem that the stronger flavor of soy sauce negates the taste of Dashi and the stronger taste of Dashi brings a fishy taste derived from Dashi to spoil the flavor of the liquid seasoning. To bring out a milder flavor of a liquid seasoning, a high skill is required. To do so, a well-established Soba (buckwheat noodle) restaurant blends "Kaeshi" from soy sauce and sugar, etc., ripens it for a given time ("Nekase") to impart a mild ripened taste, and uses it in production of a liquid seasoning. However, when a packaged men-tsuyu is industrially produced, it is actually difficult from the points of productivity and quality control that "Kaeshi" is produced and then the liquid seasoning is produced by blending "Kaeshi" and "Dashi", followed by "Nekase" as in a well-established Soba restaurant.

To address this, soy sauces having less taste of soy sauce and suitable for Tsuyu (a soup for noodles) have been proposed (JP-A-5-115261, JP-A-9-271351, JP-A-2004-141014).

In addition, in industrial production of packaged Ponzu and the like containing highly acidic vinegar and citrus fruits juice, there are problems that less contents of vinegar and citrus fruits juice leads the stronger taste of soy sauce to kill the characteristic refreshing flavor of vinegar and citrus fruits juice and that storage stability decreases. There are also problems that excessive content of vinegar and citrus fruits juice contained leads to a stronger sour taste and/or the generation of a stuffy smell to kill the flavor of the liquid seasoning and that cost becomes high. To address this, a technique of masking an unfavorable flavor of an acidic seasoning containing citrus fruits juice and soy sauce has been disclosed (JP-A-2001-78700). The technique however has a disadvantage of reducing the sour taste as well as the unfavorable flavor of the acidic seasoning, resulting in a reduced refreshing flavor.

The present inventors have investigated flavonoids for use in liquid seasonings, and found that color tone in foods cooked with a liquid seasoning often changes in some use conditions. The present inventors have then studied for a relationship between the kind of flavonoids and color change in foods, and have found that use of a seasoning containing rutin in dishes with egg result in dishes having badly damaged appearance due to the color change of egg from natural yellow to brown.

SUMMARY OF THE INVENTION

Therefore, the present invention relates to a packaged liquid seasoning containing a flavonoid having useful physiological effects, which is controlled not to cause color change in foods, particularly in egg dishes, has good flavor with suppressed abnormal taste derived from the flavonoid, can reduce the amount of common salt by having an action of enhancing salty taste retention, and has useful physiological functions such as a hypotensive action.

The present invention also relates to a useful packaged liquid seasoning having good flavor, which has the appropriate flavor of Dashi, refreshing flavor of vinegar and citrus fruits juice, and good ripened flavor with not too strong taste of soy sauce, and can have good physiological functions such as a hypotensive action.

The present inventors have investigated to apply flavonoids having useful physiological functions to liquid seasonings having good flavor. As a result of that, they have found that a specific composition containing a specific flavonoid, sodium, and ethanol can provide a packaged liquid seasoning that can control color change in foods, has good flavor with suppressed abnormal taste derived from the flavonoid, can reduce the amount of common salt by having an action of enhancing a salty taste retention, and have good physiological functions such as a hypotensive action.

Namely, the present invention provides a liquid seasoning containing the following (A), (B), and (C):
(A) 0.4 to 8% by mass of sodium
(B) 0.01 to 4% by mass of flavonoid
(C) 1 to 10% by mass of ethanol
wherein, the flavonoid (B) satisfies the following formula (1) and/or has one or more OH groups on the A-ring or B-ring in a molecule and no OH group at the position adjacent to the OH group (ortho position).

$$Y/(X+Y)=0.05 \text{ to } 1 \quad \text{formula (1)}$$

wherein, X and Y represent the following numbers, respectively:
X; the number of OH group bonded to benzene rings in a molecule of the flavonoid;
Y; the number of $OCH_3$ group bonded to benzene rings in a molecule of the flavonoid.

According to the present invention, a packaged liquid seasoning can be obtained, which contains a flavonoid but is controlled not to cause color change in foods, has good flavor with suppressed bitter, astringent, and harsh tastes derived from the flavonoid, and has an enhanced salty taste retention. It is also possible to apply flavonoids having useful physiological functions such as a hypotensive action to packaged liquid seasonings. Further, use of the packaged liquid seasoning of the present invention makes it possible to design and produce a food containing less amount of sodium.

DETAILED DESCRIPTION OF THE INVENTION

In the packaged liquid seasoning of the present invention, the sodium (A), the specific flavonoid (B) and the ethanol (C) need to be contained.

In the present invention, the sodium (A) refers to "sodium" or "Na" in food ingredient labeling, which is contained in a seasoning as a salt form and presents as the ion form in a liquid seasoning (the same applies to the alkali metal or alkaline earth metal other than sodium described below). Sodium is one of the essential electrolytes for the human body, the most part of which is distributed in extracellular fluid. A concentration thereof is maintained about 135 to 145 mol/L. It accounts for much of the cations in extracellular fluid. An excess intake of sodium thus causes fluid retention for keeping a concentration, and hence contributes heavily to high blood pressure.

The liquid seasoning of the present invention contains the sodium (A) in an amount of 0.4 to 8% by mass (hereinafter, simply referred to as "%"), preferably 1.4 to 7.4%, more preferably 2.2 to 6.2%, even more preferably 3.1 to 5.7%, even more preferably 3.6 to 5.4%, and even more preferably 3.8 to 5.1%, from the points of a salty taste, storage stability, reduction in intake of common salt, and industrial productivity.

In the present invention, examples of the sodium that can be used include inorganic sodium salts, organic acid sodium salts, amino acid sodium salts, and nucleic acid sodium salts. Specific examples thereof include sodium chloride, sodium glutamate, sodium aspartate, sodium gluconate, sodium succinate, sodium inosinate, sodium guanylate, and mixtures of two or more of them. Among them, common salt mainly containing sodium chloride is preferably used from the point of cost.

Various salts are commercially available, including, but not limited to, common, regular, and imported solar salts offered from Japan Tobacco Inc. Among common salts, preferred are those containing 0.01 to 2 parts by weight (hereinafter, simply referred to as "parts") of magnesium chloride, 0.01 to 2 parts of calcium chloride and 0.01 to 2 parts of potassium chloride relative to 100 parts of sodium chloride based on a dry product, from the points of flavor and industrial productivity. In the present invention, the content of sodium can be measured with an atomic absorption spectrophotometer (HITACHI Polarized Zeeman Atomic Absorption Spectrophotometer Z-6100).

In the present invention, the liquid seasoning refers to a seasoning in the liquid form generally containing common salt such as soy sauce, Tare (thickened sauce), Tsuyu, Dashi, and sauce. The soy sauce includes "Shoyu" and "processed Shoyu." The "Shoyu" refers to a liquid seasoning as defined by Japanese Agricultural Standard. The "processed shoyu" refers to a liquid seasoning similarly used as "Shoyu," prepared by adding a seasoning agent, an acidulant, a flavorant, Dashi, an extract, and the like to the "Shoyu."

An excess intake of common salt adversely affects kidney disease, cardiac disease, and hypertension. To suppress the amount of common salt taken, the liquid seasoning of the present invention is preferably one of the soy sauces often used in everyday life. Examples of soy sauce include soy sauce containing more than 5.5 g of sodium calculated as sodium chloride in 100 g of product, a low-salt soy sauce containing more than 3.55 g to 5.5 g or less of sodium, and a reduced-salt soy sauce containing 3.55 g or less of sodium. From the points of an amount of common salt taken, compatibility in flavor with the ingredient (B), the liquid seasoning is preferably a low-salt or reduced-salt soy sauce.

In the liquid seasoning of the present invention, the content of the flavonoid (B) is 0.01 to 4%, preferably 0.06 to 2%, more preferably 0.1 to 1.5%, even more preferably 0.2 to 1%, and even more preferably 0.3 to 0.8%, from the points of control of color change, flavor balance, and physiological effect.

Further, in the present invention, the content of the flavonoid in the liquid seasoning is preferably 0.25 to 50 parts, more preferably 1.25 to 40 parts, even more preferably 2.5 to 30 parts, even more preferably 5 to 25 parts, even more preferably 7 to 23 parts, and even more preferably 9 to 22 parts relative to 100 parts of sodium, from the point of flavor balance.

In the present invention, the flavonoid includes flavonoids, glycosides thereof (hereinafter, referred to as "flavonoid glycosides" or simply "glycosides"), those obtained by further addition of sugar (for distinguishing from glycosides, which are also sugar-adduct, those obtained by further addition of sugar to glycosides are referred to as "sugar adducts" hereinafter), and those processed with enzymes. The flavonoid refers to flavone, flavonol, flavanone, flavanonol, isoflavone in a more limited sense, but in a wider sense, refers to a group of compounds having a $C_6$-$C_3$-$C_6$ basic structure, including flavane, flavanol, isoflavanone, anthocyanidin, leucoanthocyanidin, proanthocyanidin, and the like ("Shokuhin no Henshoku no Kagaku (chemistry of color change in foods)," Susumu Kimura eds., Korin, 1995).

Benzene rings at both ends in a flavonoid molecule are called A-ring and B-ring, respectively. A pyran ring (or pyrone ring) between them is called C-ring. Those having different numbers of OH group (hydroxyl group) or $OCH_3$ group (methoxy group) bonded to A-ring and B-ring are also included in the flavonoid. Examples of the flavonoid include tangeretin, auranetin, sinensetin, isosinensetin, limocitrin, limocitol, nobiletin, acacetin, desmetin, apigenin, luteolin, kaempferol, quercetin, myricetin, isorhamnetin, chrysoeriol, isosakuranetin, hesperetin, naringenin, eriodictyol, daidzein, glycitein, genistein, pelargonidin, cyanidin, peonidin, delphinidin, petunidin, malvidin, tricine, morin, and pectolinarigenin.

The flavonoid glycoside refers that obtained by bonding sugar to the flavonoid through a glycoside linkage. Those to which the sugar does not bond refer to aglycones. Glycosides include O-glycosides in which sugar bonds to a hydroxyl group in a flavonoid molecule through a glycoside linkage and C-glycosides in which sugar bonds to the A-ring or B-ring ("Shokuhin no Henshoku no Kagaku (chemistry of color change in foods)," Susumu Kimura eds., Korin, 1995).

Examples of the flavonoid glycoside include flavone glycoside, flavane glycoside, flavanone glycoside, flavanol glycoside, flavanonol glycoside, flavonol glycoside, isoflavone glycoside, isoflavanone glycoside, anthocyanidin glycoside, leucoanthocyanidin glycoside, and proanthocyanidin glycoside. Preferred are flavone glycoside, flavane glycoside, flavanone glycoside, flavanol glycoside, flavanonol glycoside, flavonol glycoside, isoflavone glycoside and isoflavanone glycoside, which may be alone or a mixture of two or more of them. Those having different numbers of OH group (hydroxyl group) or $OCH_3$ group (methoxy group) bonded to the A-ring and the B-ring are also included. Among them, those having particularly a hypotensive action are preferred.

Examples of the sugar bonding to the flavonoid include monosaccharides such as glucose, galactose, rhamnose, xylose, arabinose, and apiose; disaccharides such as rutinose, neohesperidose, sophorose, sambubiose, and laminaribiose; trisaccharides such as gentiotriose, glucosylrutinose, and glucosylneohesperidose; additional sugar adducts of these sugars; and mixtures thereof. From the points of flavor and water-solubility, additional sugar adducts of those sugars are preferred.

The flavonoid glycoside is composed of the aglycone and sugar which are bonded to each other. Specific examples of the flavonoid glycoside include hesperidin, neohesperidin, eriocitrin, neoeriocitrin, naringin, narirutin, prunin, didymin, poncirin, astragalin, isoquercitrin, quercitrin, rutin, hyperin, quercimeritrin, myricitrin, daidzin, glycitin, genistin, callistephin, chrisanthemin, cyanine, keracyanin, idaein, mecocyanine, peonin, delphin, nasunin, petunin, malvin, enin, narirutin, rhoifolin, apiin, linaroside, brassidin, narcissin, sugar adducts thereof, derivatives thereof, enzyme-processed products thereof, and mixtures of them. From the points of flavor and water-solubility, sugar adducts such as a glucose-adduct of hesperidin (trade name: αG-hesperidin PA-T, Toyo Sugar Reining Co. Ltd.) are preferably used.

In the present invention, the flavonoid (B) also preferably satisfies the following formula (1), from the points of flavor and suppression of color change.

$$Y/(X+Y)=0.05 \text{ to } 1 \quad \text{formula (1)}$$

wherein, X and Y represent the following numbers, respectively.

X; the number of OH group bonded to benzene rings in a molecule of the flavonoid.

Y; the number of $OCH_3$ group bonded to benzene rings in a molecule of the flavonoid.

In the present invention, a value of the formula (1) is preferably 0.05 to 1, more preferably 0.1 to 0.7, even more preferably 0.15 to 0.5, even more preferably 0.2 to 0.45, even more preferably 0.25 to 0.4, and even more preferably 0.27 to 0.35, from the points of enhancement of a salty taste, suppression of abnormal taste, and stability. Since an OH group bonded to a benzene ring is particularly easily oxidized during storage, those having an $OCH_3$ group instead of the OH group and a value of the formula (1) within the range described above are preferred. Specific examples that satisfy the formula (1) include hesperidin, methylhesperidin, pectolinarigenin, nobiletin, brassidin, narcissin, linaroside, tricine, isorhamnetin, tangeritin, sinensetin, diosmin, acacetin, hesperetin, hesperidinase-treated hesperidin, malvin, enin, petunin, peonin, sugar adducts thereof, and mixtures of two or more of them. Preferred are hesperetin, hesperidin, hesperidin-sugar adducts, hesperidinase-treated hesperidin, methylhesperidin and mixtures of two or more of them. More preferred are hesperidin, hesperidin-sugar adducts, and mixtures of two or more of them, from the points of suppression of color change, flavor, water-solubility, and industrial productivity.

In the present invention, the flavonoid (B) preferably has one or more OH groups on the A-ring or the B-ring of a molecule and no OH group at the position adjacent to the OH group (ortho position), from the points of flavor and suppression of color change. The flavonoid (B) also preferably has one or more OH groups on each of the A-ring and the B-ring, from the same points.

Specifically, preferred are naringin, naringenin, apiin, apigenin, cosmetin, astragalin, kaempferol, morin, narirutin, rhoifolin, acacetin, isorhamnetin, tricine, nobiletin, pectolinarigenin, tangeretin, narcissin, brassidin, diosmin, linaroside, sinensetin, and mixtures of two or more of them. More preferred are naringin, naringenin, apiin, apigenin, cosmetin, astragalin, kaempferol, morin, narirutin, rhoifolin, and mixtures of two or more selected therefrom, from the points of suppression of color change and industrial productivity.

In the present invention, the flavonoid (B) is preferably the flavonoid glycoside, from the point of solubility. For the flavonoid glycoside, a percentage by mass of the glycoside represented by the formula (1) is preferably 80% or more, more preferably from 85 to 100%, even more preferably from 90 to 99.9%, and even more preferably 91 to 99%, from the points of flavor and solubility.

$$\text{glycoside}/(\text{glycoside}+\text{aglycon})\times 100(\%) \quad \text{formula (1)}$$

In the present invention, the content of the flavonoid (B) can be measured by high performance liquid chromatography (HPLC) ("Shokuhin no Henshoku no Kagaku (chemistry of color change in foods)," Susumu Kimura eds., Korin, 1995). For example, naringenin and naringin can be measured by the method described in JP-A-2002-199896. Apigenin can be measured by the method described below.

<Example of HPLC Analysis> apigenin (7,4',5-trihydroxyflavone)

eluent; aqueous solution of acetonitrile/25 mM potassium dihydrogenphosphate (pH 2.4)=30:70 (v/v)

column; Mightysil RP-18 GP 150-4.6 5 μm detector; UV340 nm flow rate; 1 ml/min

In the present invention, the content of the ethanol (C) in the liquid seasoning is preferably from 1 to 10%, more preferably from 2 to 7%, even more preferably from 2.5 to less than 5%, and even more preferably from 3 to 4.5% to increase solubility of the flavonoid and give a totally clean taste.

Further, the content of the ethanol (C) in the liquid seasoning is 25 to 250 parts, preferably 40 to 200 parts, more preferably 55 to 175 parts, even more preferably 70 to 150 parts, even more preferably 80 to 135 parts, and even more preferably 85 to 125 parts relative to 100 parts of the sodium (A), from the points of solubility of the flavonoid, flavor balance, and clean taste.

In the present invention, the content of the ethanol (C) in the liquid seasoning refers to the total amount of ethanol derived from raw materials and ethanol further added. In other words, when liquors such as Japanese sake and wine, brewed seasonings such as soy sauce and Mirin (sweet rice wine for seasoning), and other fermented materials are used as raw materials for the liquid seasoning, ethanol derived from the raw material can be contained in the liquid seasoning. In this case, the total amount of ethanol derived from raw materials and further added is to be within the range described above. The content of the ethanol (C) can be measured by gas chromatography (GLC).

In the present invention, the content of sugar (D) in the liquid seasoning is preferably less than 3.5, more preferably 0.1 to 3%, even more preferably 0.2 to 2%, and even more preferably 0.5 to 1.5%, from the point of flavor balance. Examples of the sugar include glucose, galactose, arabinose, fructose, sucrose, maltose, liquid sugar, inverted sugar, starch syrup, starch, dextrin, and sugar alcohols such as erythritol, glycerol, sorbitol, trehalose and reduced starch syrup.

In the liquid seasoning of the present invention, the pH is preferably 3 to 6.5, more preferably 4 to 6, even more preferably 4.5 to 5.5, and even more preferably 4.6 to less than 5.0, from the point of suppression of flavor change. Further, the liquid seasoning of the present invention preferably has specific values of 4 to 9% of chlorine content and 20 to 45% of solid matter content.

In the present invention, when the liquid seasoning is one of the Tsuyu, the Tare, and Dashi-added soy sauce (hereinafter, referred to as "Tsuyu"), it is preferably a packaged liquid seasoning containing the following (A), (B), (C), and (D):
(A) 0.2 to 8% of sodium
(B) 0.01 to 4% of flavonoid glycoside
(C) 0.2 to 10% of ethanol
(D) 3.5 to 30% of sugar In the present invention, the Tsuyu includes Men-tsuyu (unconcentrated and concentrated types), Oden-tsuyu (soup for Japanese hotchpotch), Nabemono-tsuyu (soup for quick stew), Nimono-tsuyu (soup for Japanese stew), Ten-tsuyu (soup for tempura), Tendon-tsuyu (soup for tempura bowl) and the like. The Tare includes Kabayaki-no-tare (soup for broiled fish), Teriyaki-no-tare (soup for teriyaki), Yakiniku-no-tare (soup for roasted meat), Yakitori-no-tare (soup for roasted chicken), Sukiyaki-no-tare (soup for sukiyaki), Syabusyabu-no-tare (soup for boiled meat) and the like. The Tsuyu also includes Dashi-added soy sauce, Tosa soy sauce and Matsumae soy sauce.

In the present invention, when the liquid seasoning is one of the Tsuyu, the sodium (A) is 0.2 to 8%, preferably 0.3 to 6%, more preferably 0.4 to 5%, even more preferably 1.5 to 4%, even more preferably 2.1 to 3.5%, and even more preferably 2.4 to 3.2%, from the points of ripened flavor, taste of soy sauce, flavor of Dashi, storage stability, physiological effect, and industrial productivity.

In the present invention, when the liquid seasoning is one of the Tsuyu, the content of the flavonoid glycoside (B) is 0.01 to 4%, preferably 0.06 to 2%, more preferably 0.08 to 1.5%, even more preferably 0.1 to 1%, and even more preferably 0.12 to 0.7%, from the points of suppression of abnormal taste derived from the flavonoid, ripened flavor, taste of soy sauce, flavor of Dashi, and physiological effect. The content of the flavonoid glycoside is preferably 0.25 to 50 parts, more preferably 1.25 to 40 parts, even more preferably 2 to 30 parts, even more preferably 3 to 20 parts, even more preferably 3.5 to 10 parts, and even more preferably 4 to 7 parts relative to 100 parts of sodium, from the points of suppression of abnormal taste derived from flavonoid, ripened flavor, taste of soy sauce, flavor of Dashi, and flavor balance.

In the present invention, when the liquid seasoning is one of the Tsuyu, the content of the ethanol (C) is 0.2 to 10%, preferably 0.5 to 7%, more preferably 1 to less than 5%, even more preferably 2 to 4.5%, and even more preferably 3 to 4%. Within the range, the ethanol (C) works together with the ingredient (D) to increase solubility of the flavonoid, to significantly reduce the abnormal taste of the flavonoid, and to give a totally clean taste, storage stability, and good flavor balance. The content of the ethanol (C) is 5 to 250 parts, preferably 10 to 200 parts, more preferably 20 to 180 parts, even more preferably 40 to 170 parts, even more preferably 70 to 135 parts, and even more preferably 90 to 130 parts relative to 100 parts of the sodium (A), from the points of solubility and abnormal taste of the flavonoid, flavor balance, clean taste, and storage stability.

In the present invention, when the liquid seasoning is one of the Tsuyu, it preferably contains the sugar (D). The content thereof is preferably 3.5 to 30%, more preferably 4 to 20%, even more preferably 5 to 15%, even more preferably 6 to 12%, and even more preferably 7 to 10%, from the points of abnormal taste of the flavonoid, ripened flavor, taste of soy sauce, flavor of Dashi, and flavor balance. Specific examples of the sugar include those described above. Sweeteners such as glycyrrhizin, stevioside, and aspartame may also be used according to need.

In the present invention, when the liquid seasoning is one of the Tsuyu, the content of the sugar (D) refers to the total amount of sugar derived from raw materials and sugar further added. In other words, when liquors such as Japanese sake and wine, brewed seasonings such as soy sauce and Mirin (hon-mirin, mirin-like seasoning, shio-mirin and the like), and other fermented materials are used as raw materials for the liquid seasoning, sugar derived from the raw material may be contained in the liquid seasoning. In this case, a total amount of sugar derived from raw materials and further added is to be within the range described above. The content of the sugar (D) can be measured by liquid chromatography (HPLC) ("Shoyu Shikenhou (test method for soy souce)," SOYSAUCE INFORMATION CENTER eds., ShoKyo Tsushinsha, 1985).

In the present invention, when the liquid seasoning is Ponzu or the like, it is preferably a packaged liquid seasoning which contains the following (A), (B), and (D):
(A) 0.2 to 8% of sodium
(B) 0.01 to 4% of flavonoid glycoside
(D) 3.5 to 30% of sugar
of which the pH is 2 or more and less than 4.5.

In the present invention, the Ponzu or the like refers to Ponzu (Ponzu soy sauce), Sujoyu (vinegar-mixed soy sauce), Sanbaizu (vinegar mixture), Tosazu (vinegar mixture), Matsumaezu (vinegar mixture), non-oil dressing, an aqueous phase of oil-containing dressing, and the like (hereinafter, simply referred to as "Ponzu or the like").

In the present invention, when the liquid seasoning is the Ponzu or the like, it contains the sodium (A) in an amount of 0.2 to 8%, preferably 0.3 to 6%, more preferably 0.4 to 5%, even more preferably 1.5 to 4%, even more preferably 2.1 to 3.5%, and even more preferably 2.4 to 3.2%, from the points of refreshing flavor, ripened flavor, taste of soy sauce, storage stability, physiological effect, and industrial productivity.

In the present invention, when the liquid seasoning is the Ponzu or the like, the content of the flavonoid glycoside (B) is 0.01 to 4%, preferably 0.06 to 2%, more preferably 0.08 to 1.5%, even more preferably 0.1 to 1%, and even more preferably 0.12 to 0.7%, from the points of suppression of abnormal taste derived from the flavonoid, ripened flavor, taste of soy sauce, refreshing flavor, and physiological effect.

Further, the content of the flavonoid glycoside in the packaged liquid seasoning is preferably 0.25 to 50 parts, more preferably 1.25 to 40 parts, even more preferably 2 to 30 parts, even more preferably 3 to 20 parts, even more preferably 3.5 to 10 parts, and even more preferably 4 to 7 parts relative to 100 parts of sodium, from the points of suppression of abnormal taste derived from the flavonoid, refreshing flavor, ripened flavor, taste of soy sauce, and flavor balance.

In the present invention, when the liquid seasoning is the Ponzu or the like, the content of the sugar (D) is 3.5 to 30%, preferably 4 to 20%, more preferably 5 to 15%, even more preferably 6 to 12%, and even more preferably 7 to 10%, from the points of suppression of abnormal taste derived from the flavonoid, refreshing flavor, ripened flavor, taste of soy sauce, and flavor balance. Examples of the sugar include those described above.

In the present invention, when the liquid seasoning contains (E) umami seasoning, the content thereof is preferably 0.1 to 10%, more preferably 0.5 to 7%, even more preferably 1 to 5%, even more preferably 1.5 to 4%, and even more preferably 2 to 3.5%, from the points of abnormal taste of the flavonoid, retention of aftertaste, and flavor balance.

Further, the content of the umami seasoning (E) is preferably 20 to 250 parts, more preferably 25 to 150 parts, even more preferably 30 to 100 parts, even more preferably 35 to 70 parts, and even more preferably 40 to 50 parts relative to 100 parts of sodium (A), from the points of abnormal taste of the flavonoid, retention of aftertaste, and flavor balance.

Examples of the umami seasoning (E) include protein/peptide-based seasonings, amino acid-based seasonings, nucleic acid-based seasonings, extract-based seasonings, and organic acid salt-based seasonings. Mixtures of two or more of them are preferred from the points of ripened flavor, taste of soy sauce, flavor of Dashi, and flavor balance. Amino acid-based seasonings, nucleic acid-based seasonings, and organic acid salt-based seasonings are preferred. Industrially preferred is the use of Dashi soup to which the umami seasoning is added such that the content thereof is within the range described above, from the points of suppression of fishy taste, flavoring flavor of Dashi, production efficiency, and cost.

As the Dashi soup, those that are generally used can be used in Tsuyu, Dashi-added soy sauce, and the like. That is, those obtained by extracting milled and sliced dried fishes such as Katsuobushi (dried bonito), Munetabushi (dried bonito), Magurobushi (dried tuna), Ajibushi (dried horse mackerel), and Iwashibushi (dried sardine), and Niboshi (boiled-dried fish) such as dried sardine, mackerel, and horse mackerel with water, hot water, alcohol, or soy sauce, those obtained by extracting seaweeds such as kelp and or mushrooms such as Chinese mushroom, those obtained by mixing these materials and extracting, and those obtained by mixing these extracts ("Tsuyurui-sono kagaku to kouzou—(Tsuyu—chemistry and structure thereof—)," Oota Shizuyuki, Korin, 1991).

Examples of the nucleic acid-based seasoning include sodium, potassium, or calcium salts of 5'-guanylic acid and inosinic acid, and the like. The content of the nucleic acid-based seasoning is preferably 0 to 0.2%, more preferably 0.01 to 0.1%. In the present invention, when a nucleic acid sodium salt is used, a sodium moiety constitutes the present invention as the ingredient (A), and a nucleic acid moiety as the ingredient (E). For example, disodium inosinate is calculated such that the disodium is as the ingredient (A) and the glutamic acid is as the ingredient (E).

Examples of the amino acid-based seasoning include acidic amino acids, basic amino acids, and salts thereof. In the present invention, when an amino acid sodium salt is used, a sodium moiety constitutes the present invention as the ingredient (A), and an amino acid moiety as the ingredient (E) For example, sodium glutamate is calculated such that the sodium is as the ingredient (A) and the glutamic acid is as the ingredient (E). In the liquid seasoning of the present invention, the content of the amino acid-based seasoning is preferably more than 2% for acidic amino acid, and/or more than 1% for basic amino acid. From the point of retention of a salty taste, the acidic amino acid is more preferably more than 2% and 5% or less, even more preferably 2.4 to 4.5%, and even more preferably 2.5 to 3.8%. From the point of retention of a salty taste, the basic amino acid is more than 1% and 3% or less, more preferably 1.2 to 2.5%, and even more preferably 1.5 to 2%. The liquid seasoning of the present invention is preferably based on a brewed seasoning from the points of retention of a salty taste and flavor. In this case, the amino acid includes those derived from soy sauce as a raw material. When the amino acid is less than the range described above, salts of acidic amino acid and basic amino acid are preferably further added. As used herein, "acidic amino acid, basic amino acid" refers to amino acids in the free form and in the salt state, but a content defined in the present invention refers to a value calculated based on an amino acid in the free form.

In the liquid seasoning of the present invention, among acidic amino acids and basic amino acids, preferred are acidic amino acids, aspartic acid and glutamic acid, from the point of the retention of a salty taste. Combination use of aspartic acid and glutamic acid is more preferred from the point of the retention of a salty taste. In this case, the content of aspartic acid is preferably more than 1% and 3% or less, more preferably 1.2 to 2.5%, and even more preferably 1.2 to 2%, from the point of the retention of a salty taste. When a brewed seasoning is used as a base, the aspartic acid includes those derived from the raw material. When the aspartic acid is less than the range described above, L-aspartic acid, sodium L-aspartate, and the like are preferably further added. The content of glutamic acid is preferably more than 1% and 2% or less, more preferably 1.2 to 2%, and even more preferably 1.3 to 1.8%, from the point of the retention of a salty taste. When a brewed seasoning is used as a base, the glutamic acid includes those derived from the raw material. When the glutamic acid is less than the range described above, L-glutamic acid, sodium L-glutamate, and the like are preferably further added.

Examples of the basic amino acid include lysine, arginine, histidine, and ornithine. Among them, preferred are lysine and histidine, more preferred is histidine. The content of lysine is preferably 0.5 to 1% from the point of irritation of a salty taste. The content of histidine is preferably 0.2 to 2%, and more preferably 0.5 to 1% from the points of enhancement and retention of a salty taste. When a brewed seasoning is used as a base, these basic amino acids also include those derived from raw materials brewed seasoning. When contents are less than the range described above, further addition is preferred.

Examples of other than described above include glycine, alanine, phenylalanine, cystine, threonine, tyrosine, isoleucine, and sodium and potassium salts thereof. These may be used alone or as a mixture of two or more of them. Contents of amino acids in the mixture are, calculated based on the free form for each amino acid, more than 0.3% for glycine, more than 0.7% for alanine, more than 0.5% for phenylalanine, more than 0% for cystine, more than 0.3% for threonine, more than 0.2% for tyrosine, and more than 0.5% for isoleucine, and 1.5% or less for each amino acid. Among them, isoleucine is preferred from the point of retention of a salty taste. The content thereof is preferably 0.5 to 1%.

The content of the amino acid can be measured with an amino acid analyzer (HITACHI L-8800). Contents of the nucleic acid and organic acid can be measured by high performance liquid chromatography (HPLC).

In the present invention, as the organic acid salt-based seasoning, sodium salts and potassium salts of organic acids such as lactic acid, succinic acid, malic acid, citric acid, tartaric acid, and gluconic acid can be used. More preferred are disodium succinate and sodium gluconate. Contents thereof are preferably 0 to 0.3%, and more preferably 0.05 to 0.2%. In the present invention, when an organic acid sodium salt is used, the sodium moiety corresponds to the ingredient (A) of the present invention and the organic acid moiety corresponds to the ingredient (E). For example, sodium gluconate is calculated such that the disodium is as the ingredient (A) and the gluconic acid is as the ingredient (E).

In the present invention, nucleic acid-based seasonings, amino acid-based seasonings other than the ingredient (E), organic acid salt-based seasonings, and acidulants are preferably contained, from the points of synergetic enhancement of a salty taste, as well as reduction of bitter taste and enhancement of taste of soy sauce, and the like.

In the present invention, use of an alkali metal other than sodium or an alkaline earth metal is preferred from the point of flavor and reduction of sodium intake.

In the present invention, as an alkali metal other than sodium or an alkaline earth metal, preferred are potassium salt, magnesium salt and calcium salt from the point of flavor. Examples of the potassium salt include potassium chloride, potassium citrate, potassium glutamate, potassium tartrate, potassium phosphate, potassium carbonate, and potassium metaphosphate. From the point of less abnormal taste, potassium chloride is preferred. Examples of the magnesium salt include magnesium chloride, magnesium glutamate, magnesium oxide, magnesium carbonate, and magnesium sulfate. From the point of a natural salty taste, magnesium chloride is preferred. Examples of the calcium salt include calcium chloride, calcium lactate, calcium citrate, calcium glycerophosphate, calcium gluconate, calcium glutamate, calcined calcium, calcium phosphate, calcium carbonate, ribonucleotide calcium, and calcium sulfate. From the point of quality of flavor/taste, calcium lactate is preferred.

The packaged liquid seasoning of the present invention can be prepared by combining, stirring, and mixing the sodium (A), the flavonoid (B), the ethanol (C), and according to need, the sugar (D) so as to be used in a predetermined amount. The packaged liquid seasoning of the present invention may further be combined with the umami seasoning (E), as well as various additives that can be used in foods such as water, an inorganic salt, an acid, an amino acid, a nucleic acid, a sugar, an excipient, a spice, a seasoning other than umami, an antioxidant, a colorant, a preservative, a reinforcing agent, an emulsifier, and a herb, according to need.

The liquid seasoning of the present invention may be subjected to a heat treatment according to need. The liquid seasoning of the present invention can be prepared by packing a seasoning liquid in a package and subjecting it to a heat treatment or by subjecting the seasoning liquid to a heat treatment with a plate heat exchanger and then packing in a package.

In the present invention, as the acidulant, lactic acid, succinic acid, malic acid, citric acid, tartaric acid, and the like can be used. Among them, preferred are lactic acid, malic acid, and citric acid, and more preferred are lactic acid. The content of lactic acid is preferably 0 to 2%, and more preferably 0.3 to 1%. Contents of malic acid and citric acid are preferably 0 to 0.2%, and more preferably 0.02 to 0.1%.

In addition, as an additive enhancing the salty taste, ammonium chloride, calcium lactate, and the like are also effective. However, when soy sauces containing them are used for cooking, including heating, disadvantages arise because for a soy sauce containing the former, abnormal taste generates, and for a soy sauce containing the latter, a cooked food is hardened. These soy sauces are therefore not preferred as a soy sauce serving as a general seasoning.

The liquid seasoning of the present invention may further contain a substance having hypotensive action other than component (B). Examples of the other substance having hypotensive action include γ-aminobutyric acid, vinegar, nicotianamine, nucleic acid derivative, soy sauce cake, sphingolipid, flavonoids and polyphenols other than component (B), and substances having angiotensin-converting enzyme inhibiting activity. Contents of these substances in the packaged liquid seasoning are preferably 0.05 to 5%, more preferably 0.2 to 3%, and even more preferably 0.5 to 2%, from the points of physiological functions, flavor, and stability.

As the substance having angiotensin-converting enzyme inhibiting activity, peptides derived from food materials can be used. More preferred are peptides derived from milk, grain, and fish. As the peptide derived from grain, preferred are peptides having a molecular weight of 200 to 4000 derived from grain, and more preferred are peptides having a molecular weight of 200 to 4000 derived from corn. Also preferred are peptides having a molecular weight of 200 to 4000 obtained by processing corn proteins, soybean proteins, wheat proteins, and the like with a protease, and more preferred are peptides having a molecular weight of 200 to 4000 obtained by processing corn proteins with an alkaline protease (JP-A-7-284369). As the peptide derived from fish, preferred are peptides having a molecular weight of 200 to 10000 derived from fish, more preferred are peptides having a molecular weight of 200 to 10000 obtained by processing fish such as mackerel, bonito, tuna, and saury with a protease, and more preferred are peptides having a molecular weight of 200 to 10000 obtained by processing bonito protein with a protease.

Strength of angiotensin-converting enzyme inhibiting activity is represented by a concentration at which an activity of an angiotensin-converting enzyme is inhibited by 50% (IC50) When a peptide having angiotensin-converting enzyme inhibiting activity used in the present invention has IC50 around 50 to 1000 μg/mL, the liquid seasoning of the present invention is expected to have hypotensive action.

Examples of a commercial product of peptide that can be blended in the packaged liquid seasoning of the present invention include Peptino (Nihon Shokuhin Kako Co., Ltd., IC50: 130 μg/mL) as a peptide derived from corn, Glutamine Peptide GP-1 (Nisshin Pharma Inc., IC50: 508 μg/mL) as a peptide derived from wheat, HiNeute (Fuji Oil Co., Ltd., IC50: 455 μg/mL) as a peptide derived from soy beans, and PeptideStraight (Nippon Supplement Inc., IC50: 215 μg/mL) as peptide derived from bonito.

The angiotensin converting enzyme inhibiting activity of the peptide can be measured with an ACE color (Fujirebio Inc.) which is a simple and more reproducible measurement kit using a synthetic substrate, p-hydroxybenzoyl-glycyl-L-histidyl-L-leucine, for example.

In the liquid seasoning of the present invention, the nitrogen content is preferably 1.6% or more in the liquid seasoning excluding component (B) and substances having hypotensive action. It is because that the flavor is not spoiled although the flavonoid and substances having hypotensive action are contained, and the salty taste is enhanced although the sodium content is low. In addition, the nitrogen content is more preferably 1.6 to 2% by weight.

Although a nitrogen content in regular soy sauce is 1.2 to 1.6% by weight, a nitrogen content in soy sauce equal to or more than 1.6% by weight can be achieved by adding a substance containing nitrogen such as an amino acid in an amount within the range defined in the present invention to the soy sauce brewed in an usual manner or by subjecting the soy sauce to a concentration and desalting steps. For example, there are a method of removing sodium and common salt by salt restriction and adjusting a ratio of dilution with a water-based volatile component and a method of simultaneous concentration of the nitrogen content by using transfer of hydrated water of ions caused when removing sodium and common salt with an electrodialyzer. There are also a method of increasing a nitrogen content in reduced-salt soy sauce containing a lower content of common salt than regular soy sauce with an RO membrane or by vacuum concentration, and an inverse method of desalting soy sauce containing a higher content of nitrogen such as Tamari soy sauce (viscose soy sauce) and refermented soy sauce. ("Zouho Shoyu no kagaku to gijyutsu (enlarged edition, Science and Techniques of Soy Sauce production)," Tatsurokuro Tochikura, Brewing Society of Japan, 1994).

In the liquid seasoning of the present invention, to increase nitrogen content to 1.6% or more, it is also possible to add amino acid-based seasonings, nucleic acid-based seasonings, and the like, as well as the methods above.

Examples of the amino acid-based seasoning include glycine, alanine, phenylalanine, cystine, threonine, tyrosine, isoleucine, glutamic acid, aspartic acid, histidine, lysine, arginine, and sodium salt, potassium salt and hydrochloric acid salt thereof. Those may be used alone or as a mixture of two or more of them. Contents of amino acid-based seasonings are, calculated based on the free form for each amino acid, more than 0.3% of glycine, more than 0.7% of alanine, more than 0.5% of phenylalanine, more than 0% of threonine, more than 0.2% of tyrosine, more than 0.5% of isoleucine, more than 1.3% of glutamic acid, more than 0.7% of aspartic acid, more than 0.1% of histidine, more than 0.4% of lysine, and more than 0.5% of arginine. For the upper limits, glutamic acid is preferably 2% or less, aspartic acid is preferably 3% or less, and others are preferably 1.5% or less, and more preferably 1% or less. Among them, glutamic acid, aspartic acid, and isoleucine are preferred from the point of retention of a salty taste.

Use of the packaged liquid seasoning of the present invention in producing/processing/cooking foods provides effect of suppression of color change in foods. The present invention is therefore also useful for a method of processing/cooking/producing foods.

In the present invention, when the liquid seasoning produced is reduced-salt soy sauce or low-salt soy sauce, the liquid seasoning can be prepared by mixing a seasoning liquid containing soy sauce with components (A), (B), and (C). In other words, the liquid seasoning can be prepared by electrodialyzing or salting-out/diluting a raw soy sauce to produce a raw soy sauce containing a lower content of common salt (a reduced-salt raw soy sauce, a low-salt raw soy sauce), heat-treating the raw soy sauce and adding components (A), (B), and (C) thereto; alternatively by heat-treating a raw soy sauce, electrodialyzing or salting-out/diluting the raw soy sauce to produce a raw soy sauce containing a lower content of common salt (a reduced-salt raw soy sauce, a low-salt raw soy sauce) and preparing a seasoning liquid containing such a soy sauce, and adding components (A), (B), and (C) to the seasoning liquid or the like.

The liquid seasoning of the present invention is preferably a packaged liquid seasoning which is prepared by packaging the liquid seasoning in a container. The container used in the present invention preferably has a volume of 10 mL to 5 L, more preferably 50 mL to 2 L, even more preferably 100 mL to 1 L, even more preferably 300 mL to 800 mL, and even more preferably 450 to 700 mL, from the points of stability and usability. The container used in the present invention can be provided in general forms such as a molded container mainly containing poly(ethylene terephthalate) (namely PET bottle), a metal can, a paper container, and a glass bottle similarly as for usual liquid seasonings. Examples of the paper container include that obtained by box-making from a laminate including a paper substrate, a layer having barrier property (metal foil such as aluminium foil, ethylene-vinyl alcohol copolymer, vinylidene chloride copolymer and the like), and a heat sealing resin layer.

Further, the container used in the present invention preferably has an oxygen permeability index of 0.8 or less ($cm^3$/day·$m^2$). As used herein, the "oxygen permeability index" refers to a value obtained by measuring an "oxygen permeability" (unit: $cm^3$/day·bottle) according to the JIS method (K 7126 B) and dividing by a surface area of a container to convert a value per 1 $m^2$ of a material. In particular, the oxygen permeability is a value measured with a test piece (container) using an apparatus manufactured by MOCON by supplying oxygen at one side of the test piece and a nitrogen carrier gas having the same pressure at the other side and measuring transmitted oxygen with an oxygen detector (20° C., 60% relative humidity). An oxygen permeability index of the container used in the present invention is preferably 0 to 0.6, more preferably 0 to 0.4, even more preferably 0.01 to 0.2, even more preferably 0.02 to 0.15, and even more preferably 0.05 to 0.12, from the points of retention of physiological functions of the flavonoid and retention of flavor.

The container used in the present invention can be prepared by appropriately selecting materials of an inner/an intermediate/an outer layer to have the barrier property as above and bonding with adhesive according to need. As materials for the inner and the outer layers, preferably used are polypropylene (PP), polyethylene (PE), poly(ethylene terephthalate) (PET), stretched products thereof, density-modified products thereof, and composite with other materials thereof, from the points of barrier property, appearance, workability, storage stability, sense of use, and strength. Among them, preferably used are polypropylene, oriented polypropylene, polyethylene, oriented polyethylene, high density polyethylene, middle density polyethylene, low density polyethylene, linear low density polyethylene, and oriented poly(ethylene terephthalate), more preferably used are, polypropylene, oriented polypropylene, high density polyethylene, and even more preferably used is high density polyethylene.

The container may be resin containers of a single layer and multi-layer described above that are coated with a carbon film and a silicon film on the inside and the outside thereof for providing the barrier property. Examples thereof include those obtained by coating poly(ethylene terephthalate) with a carbon film and a silicon film. The container used may also be a single layer preform obtained by dry blending a PET resin with various nylon resins such as a meta-xylene group-containing polyamide resin (e.g., MXD-6 nylon resin (M×D-6 Ny)) and molding for providing the barrier property.

As an intermediate layer of the container used in the present invention, an ethylene-vinyl alcohol copolymer (EVOH) having high oxygen permeation barrier property is preferably used, from the points of barrier property, storage stability, and sense of use. For example, a copolymer saponification product obtained by saponifying an ethylene-vinyl acetate copolymer containing ethylene in an amount of 20 to 60% by mol, preferably 25 to 50% by mol, so as to be a saponification degree of 96% or more by mol, preferably 99% by mol or more, is used. The ethylene-vinyl alcohol copolymer preferably has a sufficient molecular weight for forming a film.

Examples other than the ethylene-vinyl alcohol copolymer include polyamides such as nylon 6, nylon 6,6, nylon 6/6,6 copolymer, meta-xylylene adipamide, nylon 6,10, nylon 11, nylon 12, and nylon 13.

When adhesion to other layers is insufficient not as in the case of using the ethylene-vinyl alcohol copolymer, an adhesive is preferably used. Examples of the adhesive include thermoplastic resins having a carbonyl group derived from carboxylic acid, carboxylic acid amide, carboxylic acid ester, or the like in their main or side chains. Specific examples thereof include, ethylene-acrylic acid copolymers, ionically crosslinked olefin copolymers, maleic anhydride graft polyethylenes, maleic anhydride graft polypropylenes, acrylic acid graft polyolefins, ethylene-vinyl acetate copolymers, polyester copolymers, polyamide copolymers, which may be used alone or in combination of two or more of them. These adhesive resins are useful for lamination by co-extruding or sandwich lamination. For adhesion lamination of pre-formed oxygen and moisture permeation barrier films, thermosetting adhesive resins including isocyanate resins and epoxy resins may also be used.

Among them, Admer manufactured by Mitsui Chemicals, Inc. and Modic manufactured by Mitsubishi Chemical Corporation that adhere ethylene-vinyl alcohol copolymers are more preferably used.

To impart transparency as well as the barrier property to the container used in the present invention, the container, for example, preferably has a four-layer construction including an inner and outer layers made of polypropylene (PP) that is highly transparent orientated thermoplastic resin, an intermediate layer made of cyclic olefin polymer, and an intermediate layer made of ethylene-vinyl alcohol copolymer (EVOH). There are adhesive layers in each interspace among PP layers constructing the inner and the outer layers and COP and EVOH layers constructing intermediate layers.

A cyclic olefin polymer (COP) is a resin having good transparency and moisture barrier property. AS the COP, for example, Zeonor (cycloolefin polymer) manufactured by Zeon Corporation, APEL™ (cycloolefin copolymer) manufactured by Mitsui Chemicals, Inc., and the like can be used.

The container used in the present invention can be prepared by known methods per se as long as it has the barrier property described above and transparency. For example, a multilayer extrusion molded body can be prepared by melting and kneading each resin with each extruder for each resin layer and extrusion molding with a multilayer multidie. A multilayer injection molded body can be prepared by injection molding such as co-injection and successive injection with the number of injection molding machines according to the number of kinds of resins.

Food in which the liquid seasoning of the present invention is used can be any food with no specific limitation as long as it contains common salt and soy sauce when drinking and eating. Examples of the food include soups such as Suimono (clear soup), Misoshiru (miso soup), consomme soup, potage soup, egg soup, kelp soup, and Shark's fin soup; a group of Tsuyu/soup/sauce for noodles such as Soba (buckwheat-noodle), Udon (Japanese wheat noodle), Chinese noodle, and pasta; cooked rice food such as Okayu (rice gruel), Zousui (Japanese rice soup), risotto, and Ochazuke (rice with hot tea); roux such as curry roux and Hayashi roux; processed meat products such as ham, sausage, bacon, and cheese; processed seafood such as Kamaboko (fish sausage), Himono (dried fish), Shiokara (salted and fermented viscera of marine animal), and Chinmi (delicacies); processed vegetables such as Tsukemono (Japanese pickles); snack foods such as potato chips, Sembei (Japanese rice crackers), and cookies; cooked foods such as Sashimi (sliced raw seafood), Ohitashi (boiled vegetable salad), Hiyayakko (cold tofu), Yudofu (boiled tofu), Nabemono (quick stew), Nimono (Japanese stew) Agemono (deep-fried dishes), Yakimono (grilled dishes), and Mushimono (steamed dishes). That is, examples of an application (method for using) of the packaged liquid seasoning of the present invention include (i) application of putting the liquid seasoning of the present invention over the food described above, (ii) application of dipping the food into the liquid seasoning of the present invention, (iii) application of cooking the food with the liquid seasoning of the present invention, and (iv) application of producing a processed food with the liquid seasoning of the present invention.

The content of the liquid seasoning of the present invention in a food is preferably 0.01 to 20%, more preferably 0.05 to 10%, even more preferably 0.1 to 5%, and even more preferably 0.5 to 3%, from the points of flavor balance and intake of common salt.

EXAMPLES (1) Test Examples 1 to 6

In a glass sample bottle (50 mL volume), reduced soy sauce (Marudaizu shoyu (whole soy beans soy sauce), Kikkoman Corporation) and ethanol ((Wako Pure Chemical Industries, Ltd.) were mixed so as to be 3.2% of sodium content and 4% of ethanol content, and to this was added a flavonoid. The bottle was stoppered. Respective flavonoids were added in amounts as listed in Table 1 to prepared liquid seasonings, Test Examples 1 to 6.

TABLE 1

| | Test example | | | | | |
|---|---|---|---|---|---|---|
| | 1 | 2 | 3 | 4 | 5 | 6 |
| Kind of flavonoide | None | Rutin*1 | Sugar-added rutin*2 | Apigenin*3 | Naringin*4 | Kaoliang pigment*5 |
| Compounding amount of flavonoid (%) | 0 | 0.3 | 0.5 | 0.3 | 2 | 0.4 |
| Color tone of rolled egg | A | C | C | A | A | B |
| Comment | Control Considered as A in | Gradually turned into blackish | Gradually turned into blackish | Comaparable to control though the | Comparable to control though the | Slightly somberer than control but |

TABLE 1-continued

| | | Test example | | | | |
|---|---|---|---|---|---|---|
| | | 1 | 2 | 3 | 4 | 5 | 6 |
| | color tone evaluation | | brown | brown | flavonoid was added | flavonoid was added | better than rutin-added one |
| Characteristics of structure of flavonoid | | | Having an OH group at ortho position | Having an OH group at ortho position | Having an OH group at meta position | Having an Ogly group at meta position | Containing apigenin, having an OH group at a metha position |

*1rutin (Wako Pure Chemical Industries, Ltd.) was used
*2αG-rutin P (Toyo Sugar Reining Co. Ltd.) was used
*3apigenin (Wako Pure Chemical Industries, Ltd.) was used
*4Sanfix naringin (San-Ei Gen F.F.I., Inc., containing 15% of naringin) was used.
*5Sanbrown K (San-Ei Gen F.F.I., Inc., containing 76% of Kaoliang pigment) was used.

(2) Evaluation of Rolled Egg

Chicken egg (50 g) was beaten with chop sticks. To this was added 3 g of liquid seasoning prepared in (1) and mixed. A Teflon pan, into which 0.8 g of cooking oil was placed, was heated (flow rate of urban gas: 4 L/min). To this was poured the beaten egg, and the mixture was formed with chop sticks to prepare a rolled egg. A color tone of the obtained rolled egg was visually evaluated according to the following evaluation rating. In the evaluation, a rolled egg prepared with the liquid seasoning 1 (reduced-salt soy sauce without flavonoid) was considered as control. Results are listed in Table 1.
<Evaluation Rating>
A; equivalent color tone to control, favorable.
B; slightly darker than control but acceptable, slightly favorable.
C; much darker than control and turned into a blackish brown color, unacceptable color tone, unfavorable.

As shown in Table 1, rolled eggs prepared with Test Examples 2 and 3 gradually became darker during preparation and turned into a blackish brown color, which were unfavorable. In contrast, rolled eggs prepared with Test Examples 4 and 5 showed equivalent color tones to control and were favorable, though these contained flavonoids. A rolled egg prepared with Test Examples 6 (containing a Kaoliang pigment containing apigenin or the like) was slightly favorable. That is, the rolled egg prepared with Test Example 6 was slightly darker than control, but more controlled in color change than rolled eggs prepared with Test Examples 2 and 3.

As described above, in cases using Test Examples 2 and 3 (containing flavonoids having an OH group at a position adjacent to an OH group (an ortho position) in a flavonoid), cooked eggs exhibited significant color change and were unfavorable. In contrast, in cases using Test Examples 4 to 6 (containing flavonoids not having an OH group at a position adjacent to an OH group (an ortho position) in a flavonoid), cooked eggs exhibited better color tones than that with Test Examples 2 and 3, though those were added with flavonoids. Cooked eggs of Test Examples 4 and 5 were more favorable with equivalent color tone to a cooked egg with the liquid seasoning 1 without flavonoid, though these were added with flavonoids.

(5) Packaged Liquid Seasoning N 500 parts of soy sauce (Kikkoman Corporation/Tokusen Maru-daizu shoyu (premium whole soy beans soy sauce)) and 500 parts of reduced-salt soy sauce (YAMASA Corporation/redyced-salt soy sauce) were mixed. To this were added 40 parts of naringin (San-Ei Gen F.F.I., Inc.,/Sanfix naringin, naringin content: 15%) and ethanol, and stirred and mixed. This was heated to 70° C., packed in a 500 mL PET container to prepare a packaged liquid seasoning N (low-salt soy sauce, sodium content: 4.5%, ethanol content: 4.5%)

(6) Test Examples 7 to 18

In glass sample bottles (50 mL volume), pure water, common salt, ethanol (Wako Pure Chemical Industries, Ltd.), and a rutin sugar adduct (αG-rutin PS, Toyo Sugar Reining Co. Ltd., Y/(X+Y)=0) were placed in compositions listed in Table 2. Bottles were stoppered. Contents were then dissolved to prepare packaged liquid seasonings (Test Examples 7 to 18). Samples containing the ingredient (B) at the same concentrations as of Test Examples without ingredients (A) and (C) were used as controls for evaluating the abnormal taste derived from flavonoids. A sample (Test Examples 16) containing ingredients (A) and (C) at the same concentrations without the ingredient (B) was used as a control for evaluating the salty taste of Test Examples. Test Examples were subjected to sensory evaluation for flavor according to the following rating. Results are listed in Table 2.

[Evaluation Rating for Abnormal Taste of Flavonoid]
a: there is no bitter taste, astringent taste, or harsh taste derived from flavonoid.
b: quite reduced bitter taste, astringent taste, or harsh taste derived from flavonoid compared with control.
c: slightly reduced bitter taste, astringent taste, or harsh taste derived from flavonoid compared with control.
d: equivalent bitter taste, astringent taste or harsh taste derived from flavonoid to control.
e: stronger bitter taste, astringent taste, or harsh taste derived from flavonoid compared with control.

[Evaluation Rating for Salty Taste]
a: quite enhanced retention of the salty taste compared with control.
b: enhanced retention of the salty taste compared with control.
c: slightly enhanced retention of the salty taste compared with control.
d: equivalent retention of the salty taste to control.
e: reduced retention of the salty taste compared with control.

TABLE 2

| | | Test example | | | | | |
|---|---|---|---|---|---|---|---|
| | | 7 | 8 | 9 | 10 | 11 | 12 |
| Composition (weight parts) | Common salt | 10 | 10 | 10 | 10 | 10 | 10 |
| | αG-rutin | 0.01 | 0.05 | 0.1 | 0.3 | 0.5 | 0.8 |
| | Ethanol | 4 | 4 | 4 | 4 | 4 | 4 |
| | Pure water | 85.99 | 85.95 | 85.9 | 85.7 | 85.5 | 85.2 |
| Evaluation of flavor | Abnormal taste derived from fravonoid | a | a | a | a | a-b | b |
| | Retention of salty taste | d | c | b | a-b | a | a |
| | Comment | No abnormal taste Slightly retention of salty taste Clean taste | No abnormal taste Slightly retention of salty taste Slight sharpened saltiness Clean taste | No abnormal taste Retention of salty taste Sharpened saltiness Clean taste | No abnormal taste Slight strong retention of salty taste Sharpened saltiness Clean taste | Little astringent taste Strong retention of salty taste Sharpened saltiness Clean taste | Slight astringent taste but not uncomfortable Strong retention of salty taste Sharpened saltiness Clean taste |

| | | Test example | | | | | |
|---|---|---|---|---|---|---|---|
| | | 13 | 14 | 15 | 16 | 17 | 18 |
| Composition (weight parts) | Common salt | 10 | 10 | 10 | 10 | 10 | 10 |
| | αG-rutin | 1 | 1.5 | 3 | 0 | 0 | 0.3 |
| | Ethanol | 4 | 4 | 4 | 4 | 0 | 0 |
| | Pure water | 85 | 84.5 | 83 | 86 | 90 | 89.7 |
| Evaluation of flavor | Abnormal taste derived from fravonoid | c-d | c-d | d | a | a | b |
| | Retention of salty taste | a | a | a | d | c | a |
| | comment | Astringent taste and bitter taste Strong retention of salty taste Sharpened saltiness Clean taste | Astringent taste and bitter taste Strong retention of salty taste Sharpened saltiness Clean taste | Strong astringent taste and bitter taste, uncomfortable Strong retention of salty taste Sharpened saltiness Clean taste | Used as control for safety taste (rating: d) Larger reduced salty taste than Test example 11 Clean taste | Strongest salty taste Short retention No clean taste | Slight abnormal taste Strong retention of salty taste Sharpened saltiness No clean taste |

Test Examples 16 was used as a control of the salty taste (rating: d).

Samples containing the ingredient (B) at the same concentrations were used as controls of abnormal taste (rating: d).

As shown in Table 2, in Test Examples 7 to 14, bitter taste, astringent taste, and harsh taste derived from flavonoids were suppressed, compared with controls. In Test Examples 8 to 15, retention of the salty taste was stronger than the control. In contrast, Test Examples 18 without ethanol had slight abnormal taste derived from a flavonoid and could not achieve a clean taste, which was unfavorable.

As described above, it was shown that the packaged liquid seasoning containing specific amounts of flavonoid and ethanol had improved flavor.

(7) Test Examples 19 to 28

In glass sample bottles (50 mL volume), pure water, common salt, ethanol (Wako Pure Chemical Industries, Ltd.), and a hesperidin sugar adduct (αG-hesperidin PA-T, Toyo Sugar Reining Co. Ltd., Y/(X+Y)=0.33) were placed in compositions listed in Table 3. Bottles were stoppered. Contents were dissolved to prepare packaged liquid seasonings (Test Examples 19 to 28). Samples containing the ingredient (B) at the same concentrations as of Test Examples without ingredients (A) and (C) were used as controls for evaluating abnormal taste derived from flavonoids. A sample (Test Examples 16) containing ingredients (A) and (C) at the same concentrations without the ingredient (B) was used as a control for evaluating the salty taste of Test Examples. Test Examples were subjected to sensory evaluation for flavor according to the similar rating as in (6). Results are listed in Table 3.

TABLE 3

| | | Tetst example | | | | | |
|---|---|---|---|---|---|---|---|
| | | 19 | 20 | 21 | 22 | 23 | |
| Composition (weight part) | Common salt | 10 | 10 | 10 | 10 | 10 | |
| | αG-hesperidin | 0.01 | 0.05 | 0.1 | 0.3 | 0.5 | |
| | Ethanol | 4 | 4 | 4 | 4 | 4 | |
| | Pure water | 85.99 | 85.95 | 85.9 | 85.7 | 85.5 | |

TABLE 3-continued

| Evaluation of flavor | Abnormal taste of flavonoid | a | a | a | a | a-b |
|---|---|---|---|---|---|---|
| | Retention of salty taste | d | c | b | a-b | a |
| | Comment | No astringent taste Slight retention of salty taste Clean taste | No astringent taste Slight retention of salty taste Slight sharpened saltiness Clean taste | No astringent taste Retention of salty taste Sharpened saltiness Clean taste | No astringent taste Slight retention of salty taste Sharpened saltiness Clean taste | Slight astringent taste Strong retention of salty taste Clean taste |

| | | Tetst example | | | | |
|---|---|---|---|---|---|---|
| | | 24 | 25 | 26 | 27 | 28 |
| Composition (weight part) | Common salt | 10 | 10 | 10 | 10 | 10 |
| | αG-hesperidin | 0.8 | 1 | 1.5 | 3 | 0.3 |
| | Ethanol | 4 | 4 | 4 | 4 | 0 |
| | Pure water | 85.2 | 85 | 84.5 | 83 | 89.7 |
| Evalustion of flavor | Abnormal taste of flavonoid | b | c | c | c-d | a-b |
| | Retention of salty taste | a | a | a | a | a |
| | Comment | Slight astringent taste but not uncomfortable Strong retention of salty taste Clean taste | Slight astringent taste but not uncomfortable Strong retention of salty taste Clean taste | Slight astringent taste but not uncomfortable Strong retention of salty taste Clean taste | Astringent taste Strong retention of salty taste Sharpened saltiness Clean taste | Almost no abnormal taste Strong retention of salty taste Sharpened saltiness No clean taste |

Test Example 16 was used as control of the salty taste (rating: d).

Samples containing the ingredient (B) at the same concentrations were used as controls of abnormal taste (rating: d).

As shown in Table 3, in Test Examples 19 to 27, bitter taste, astringent taste, and harsh taste derived from flavonoids were suppressed, compared with controls. In Test Examples 20 to 27, retention of the salty taste was stronger than the control. In contrast, Test Example 28 without ethanol could not achieve a clean taste, which was unfavorable.

As described above, it was shown that the packaged liquid seasoning containing flavonoid and ethanol had improved flavor.

(8) Test Examples 29, 30

In a glass sample bottle (50 mL volume), pure water, common salt, monosodium glutamate, ethanol (Wako Pure Chemical Industries, Ltd.), and hesperidin sugar adduct (αG-hesperidin PA-T, Toyo Sugar Reining Co. Ltd.) were placed in a composition listed in Table 4. The bottle was stoppered. Contents were dissolved to prepare a packaged liquid seasoning (Test Example 30). Samples containing the ingredient (B) at the same concentrations as of Test Examples without ingredients (A) and (C) were used as controls for evaluating abnormal taste derived from flavonoids. A sample (Test Examples 16) containing ingredients (A) and (C) at the same concentrations without the ingredient (B) was used as a control for evaluating the salty taste of Test Examples. Test Examples 29 was used as a control for aftertaste. Test Examples were subjected to sensory evaluations for abnormal taste derived from flavonoids and retention of the salty taste according to the similar rating as in (6). Aftertaste was evaluated according to the following sensory evaluation rating. Results are listed in Table 4.

[Evaluation Rating for Aftertaste]

a: salty taste and umami taste are integrated, appropriately lasting, and provide a very good aftertaste, compared with control.

b: salty taste and umami taste are integrated, lasting, and provide a good aftertaste, compared with control.

c: salty taste and umami taste are slightly integrated, lasting, and provide a slightly good aftertaste, compared with control.

d: salty taste and umami taste are not integrated, and provide an equivalent aftertaste to control.

e: salty taste and umami taste are less integrated than control, and provide an unfavorable aftertaste.

TABLE 4

| | | Test example | |
|---|---|---|---|
| | | 29 | 30 |
| Composition (weight part) | Common salt | 10 | 10 |
| | αG-hesperidin | 0 | 0.3 |
| | Ethanol | 0 | 4 |
| | MSG | 3 | 3 |
| | Pure water | 97 | 82.7 |
| Evaluation of flavor | Abnormal taste from flavonoid | a | a |
| | Retention of salty taste | d | a-b |
| | Aftertaste including umami | d | a |

TABLE 4-continued

|  | Test example | |
|---|---|---|
|  | 29 | 30 |
| Comment | Control of aftertaste Rating d Salty taste and umami taste are not integrated and uncoordinated | No abnormal taste Salty taste and umami are integrated Strong retention of aftertaste Not cloying and clean |

Test Example 16 was used as control of the salty taste (rating: d).

Samples containing the ingredient (B) at the same concentrations were used as controls of abnormal taste (rating: d).

Test Example 29 was used as control of aftertaste.

As shown in Table 4, in Test Example 29, the salty taste and umami taste were uncoordinated and not integrated, and the aftertaste thereof was not lasting and was unfavorable. In contrast, in Test Example 30, no bitter taste, astringent taste, or harsh taste derived from the flavonoid was felt, the salty taste and umami taste were integrated and appropriately lasting, and a clean taste was provided. It was favorable.

As described above, it was shown that use of an umami seasoning further increased flavor.

(9) Packaged Liquid Seasoning R 500 parts of soy sauce (Kikkoman Corporation/Tokusen Maru-daizu shoyu) and 500 parts of reduced-salt soy sauce (YAMASA Corporation/reduced-salt soy sauce) were mixed. To this were added 5 parts of a hesperidin sugar adduct (αG-hesperidin PA-T, Toyo Sugar Reining Co. Ltd.) and ethanol, and stirred and dissolved. This was heated to 80° C., packed in a 500 mL PET container to prepare a packaged liquid seasoning R (sodium content: 4.5%, ethanol content: 4.5%). The container was opened for evaluation of flavor. The packaged liquid seasoning R had no abnormal taste derived from the flavonoid, suppressed sharpened saltiness, appropriate retention of the salty taste, and a clean flavor. It was favorable.

(10) Foods

The packaged liquid seasoning R prepared in (9) was used for preparing drink and food (sashimi and rolled egg).
<Sashimi>

Commercial tuna fillet was sliced into 5 mm thickness with a kitchen knife, and dipped in the packaged liquid seasoning R poured in a dish from an opened container to prepare sashimi.

<Rolled Egg>

Chicken egg (50 g) was beaten with chop sticks. To this was added 1.9 g of packaged liquid seasoning R that was opened, and mixed. A Teflon pan, into which 0.8 g of cooking oil was placed, was heated. To this was poured the beaten egg, and the mixture formed with chop sticks to prepare a rolled egg.

(11) Test Examples 31 to 35

In glass sample bottles (50 mL volume), reduced-salt soy sauce (Marudaizu gen-en syoyu (whole soy beans reduced-salt soy sauce), Kikkoman), and flavonoids were placed in compositions listed in Table 5. Bottles were stoppered to prepare packaged liquid seasonings (Test Examples 31 to 35).

TABLE 5

|  | Test example | | | | |
|---|---|---|---|---|---|
|  | 31 | 32 | 33 | 34 | 35 |
| Kind of flavonoid | None | rutin*1 | Sugar-added rutin*2 | Hesperetin*3 | Sugar-added hesperetin*4 |
| Compounding amount of flavonoid (%) | 0 | 0.3 | 0.5 | 0.5 | 0.3 |
| Color tone of rolled eg | A | C | C | A | A |
| Comment | Control Considered as A in color tone evaluation. | Gradually turned into blackish brown | Gradually turned into blackish brown | Comparable to control though the flavonoid was added | Comparable to control though the flavonoid was added |

*1 rutin (Wako Pure Chemical Industries, Ltd.) was used
*2 αG-rutin P (Toyo Sugar Reining Co. Ltd.) was used
*3 hesperetin (Wako Pure Chemical Industries, Ltd.) was used
*4 αG-hesperidin PA-T (Toyo Sugar Reining Co.Ltd.) was used

(12) Color Tone Evaluation

Chicken egg (50 g) was beaten with chop sticks. To this was added 3 g of liquid seasoning prepared in (11) and mixed. A Teflon pan, into which 0.8 g of cooking oil was placed, was heated (flow rate of urban gas: 4 L/min). To this was poured the beaten egg, and the mixture formed with chop sticks to prepare a rolled egg. The color tone of the obtained rolled egg was visually evaluated according to the following evaluation rating. In the evaluation, a rolled egg prepared with Test Example 31 (reduced-salt soy sauce without flavonoid) was considered as control. Results are listed in Table 5.

<Evaluation Rating>

A; equivalent color tone to control, favorable.

B; slightly darker than control but acceptable, slightly favorable.

C; much darker than control and turned into a blackish brown color, unacceptable color tone, unfavorable.

As shown in Table 5, rolled eggs prepared with Test Examples 32 and 33 gradually became darker during preparation and turned into a blackish brown color, which were unfavorable. In contrast, rolled eggs prepared with Test Examples 34 and 35 showed equivalent color tones to control and were favorable, though these contained flavonoids.

As described above, in the cases of Test Examples 32 and 33 containing flavonoids of which Y/(X+Y)=0, the color change in the rolled eggs was significant and unfavorable. In contrast, in the case of the liquid seasoning 4 containing a flavonoid of which Y/(X+Y)=0.25, a rolled egg showed equivalent color tones to the case using the liquid seasoning 1 without flavonoid, though a flavonoid was added, and was favorable. Also in the case of Test Examples 35 containing a flavonoid of which Y/(X+Y)=0.33, a rolled egg showed similar good color tone.

(13) Animal Test a) Animals Used and Breeding Conditions

Seventeen weeks old male spontaneous hypertensive rats (SHR) were bred under the conditions of 25±1° C. of room temperature, 55±10% RH of humidity, and 12 hours of lighting (from 7 a.m. to 7 p.m.) (four rats per group).

b) Sample

Samples were prepared by adding a hesperidin sugar adduct (αG-hesperidin PA-T, Toyo Sugar Reining Co. Ltd.) to reduced-salt soy sauce such that contents of adduct were 2 mg/ml, 4 mg/ml, 10 mg/ml, 20 mg/ml, and 40 mg/ml, respectively. These were used as the present inventive samples. The reduced-salt soy sauce without the hesperidin sugar adduct was used as a control.

c) Test Method

SHRs had been fasted. Samples were forcedly administered orally thereto through metal stomach tubes (5 ml/kg). Administered amounts of hesperidin sugar adduct of the present inventive samples were 10 mg/kg (group 1), 20 mg/kg (group 2), 50 mg/kg (group 3), 100 mg/kg (group 4), and 200 mg/kg (group 5), respectively. Systolic blood pressures (SBPs) of a caudal artery were measured before 6 hours and 6 hours after the oral administration with a commercially available noninvasive sphygmomanometer for rats (produced by Softron Corp.). For measured values of 6 hours after the administration, rates of change from initial values were calculated.

The obtained measurement results were expressed as average values of rate of change and the standard deviation (SE) thereof, and subjected to Dunnett's test.

d) Result

An SBP value before the administration was 209 mmHg. For the control (group 6), SBP was changed by −4.2±1.0%. For rates of change in SBP of the present inventive samples, group 1 (group administered at 10 mg/kg) was −7.7±2.7%, group 2 (group administered at 20 mg/kg) was −12.1±1.9% (5% significant), group 3 (group administered at 50 mg/kg) was −12.5±0.9% (1% significant), group 4 (group administered at 100 mg/kg) was −10.6±1.4% (5% significant), and group 5 (group administered at 200 mg/kg) was −12.7±2.1% (5% significant).

As described above, it was shown that the present inventive samples had hypotensive action.

(14) Test Examples 36, 37 (Concentrated Tsuyu)

Koikuchi (regular) soy sauce, seasonings, or the like in a composition shown in Table 6 were mixed and dissolved. It was placed in a glass sample bottle, heated (kept at 70° C. for 30 seconds after reached to the temperature), stoppered, and cooled with water. Then, it was allowed to stand for 3 days in a refrigerator (5° C.) to prepare a packaged liquid seasoning (Test Examples 36) (sodium content: 3.5%, pH=4.9). A sample containing water without a flavonoid glycoside was used as a control (Test Example 37). These were used for cooking (Kake-soba (poured-over buckwheat noodles), Tsuke-soba (buckwheat noodles with dipping sauce), Hiyay-akko) and sensory evaluated based on the evaluation rating of (6) for "evaluation for abnormal taste derived from flavonoid" and on the following evaluation ratings for others. Results are shown in Table 7. In this experiment, the flavonoid glycoside used in Test Example 36 was a hesperidin sugar adduct (aG-hesperidin PA-T, Toyo Sugar Reining Co. Ltd., Y/(X+Y)=0.33).

[Evaluation Rating for Taste of Soy Sauce]
   a: weaker taste of soy sauce than control
   b: slightly weaker taste of soy sauce than control
   c: equivalent taste of soy sauce to control
   d: slightly stronger taste of soy sauce than control
   e: stronger taste of soy sauce than control

[Evaluation Rating for Flavor of Dashi]
   a: enhanced flavor of Dashi and almost no fishy taste, compared with control
   b: enhanced flavor of Dashi with slight fishy taste but not unfavorable, compared with control
   c: enhanced flavor of Dashi with fishy taste and unfavorable, compared with control
   d: equivalent flavor of Dashi to control
   e: reduced flavor of Dashi, compared with control

[Evaluation Rating for Ripened Flavor]
   a: stronger mild ripened flavor compared with control, favorable
   b: slightly stronger mild ripened flavor compared with control, slightly favorable
   c: equivalent mild ripened flavor to control
   d: slightly weaker mild ripened flavor compared with control, slightly unfavorable
   e: weaker mild ripened flavor compared with control, unfavorable

TABLE 6

Composition of concentrated Tsuyu (parts by weight)

| | Test example | |
|---|---|---|
| | 36 | 37 |
| Common salt | 48 | 48 |
| Superfine sugar | 90 | 90 |
| Sodium glutamate | 13.8 | 13.8 |
| Disodium inosinate | 1.2 | 1.2 |
| Mirin | 45 | 45 |
| Dashi soup*[1] | 560 | 560 |
| Koikuchi soy sauce | 238.8 | 28.8 |
| αG-hesperidin PA-T | 1.2 | 0 |
| Pure water | 0 | 1.2 |
| Ethanol | 2 | 2 |

*[1]In a pot were placed 256 parts of pure water and 10 parts of kelp, and heated.

When boiled, into the pot was added 60 parts of dried bonito flake, and heated for 5 hours.

The mixture was filtered through cooking paper. The filtrate was cooled and added with pure water so as to be 560 parts.

TABLE 7

Results of evaluation of concentrated Tsuyu

| Test example 36 | Kake-soba*[2] | Tsuke-soba*[3] | Hiyayakko*[4] |
|---|---|---|---|
| Abnormal tasete of flavonoid | a | a | a |
| Taste of soy sauce | b | a-b | a |
| Flavor of Dashi | b | a-b | a |
| Ripened flavor | b | b | a |
| Comment | Absolutely no abnormal taste Weak taste of soy sauce Ripened flavor mild Good flavor of Dashi | Absolutely no abnormal taste About middle flavor between Kake-soba and Hiyayakko | Absolutely no abnormal taste Weak taste of soy sauce Strong ripened taste Highly mild Strong flavor of Dashi |

*[2]evaluation was conducted with Soba-tsuyu (1 part of concentrated Tsuyu + 6 parts of hot water) and Soba (buckwheat noodle) therein, which noodle was prepared from dry noodle by boiling.
*[3]evaluation was conducted with Soba-tsuyu (1 part of concentrated Tsuyu + 2 parts of iced water) and Soba therein, which noodle was prepared from dry noodle by boiling.
*[4]evaluation was conducted with concentrated Tsuyu and tofu (Momen) on which the Tsuyu was poured.

As shown in Table 7, in Test Example 36, there was no abnormal taste derived from flavonoid at all, and compared with control, reduced taste of soy sauce, better flavor of Dashi, and better ripened flavor. Tendencies ware similar among evaluations of the undiluted case (Hiyayakko) and of diluted cases with water (Kake-soba and Tsuke-soba).

As described above, it was shown that the packaged liquid seasoning containing specific amounts of sodium, flavonoid glycoside, ethanol, and sugar had improved flavor.

(15) Test Examples 38 (Sukiyaki-No-Tare)

Reduced-salt soy sauce, seasonings, etc. in a composition shown in Table 8 were mixed and dissolved. It was placed in a glass sample bottle, heated (temperature of a content: kept at 80° C. for 30 seconds after reached to the temperature), transferred into a PET container (500 mL volume) and cooled with water. Then, it was stoppered and allowed to stand for 3 days in a refrigerator (5° C.) to prepare a packaged liquid seasoning (Test Examples 38) (sodium content: 0.63%).

TABLE 8

Composition of Sukiyaki-no tare (parts by mass)

|  | Test example 38 |
|---|---|
| Superfine sugar | 18 |
| Sodium glutamate | 3.54 |
| Disodium isosianate | 0.04 |
| Lactic acid | 0.49 |
| Mirin | 108 |
| Reduced-salt soy sauce | 103.59 |
| αG-hesperidin PA-T | 0.54 |
| Pure water | 400 |
| Ethanol | 2.8 |

Sugars; 9.9%

(16) Sukiyaki

The packaged liquid seasoning (Test Example 38) prepared in (15) was used for preparing sukiyaki according to the following method. The resultant sukiyaki exhibited good flavor.

<Ingredients>

| | |
|---|---|
| beef (thin slice) | 200 parts |
| welsh onion (round slice of 5 cm thickness) | 75 parts |
| shirataki (white yam noodle) | 100 parts |
| baked tofu (cut into bite-sized pieces) | 150 parts |
| garland chrysanthemum | 70 parts |
| cooking oil | 13 parts |
| packaged liquid seasoning (Test Example 38) | 350 parts |

<Cooking Method>

To a pot was placed in cooking oil, and heated. Then, to this were added beef and welsh onion and cooked. When the ingredients were browned, the packaged liquid seasoning (Test Example 38) was opened and poured into the pot. When the soup became boiling, to the pot were added shirataki and baked tofu. Three minutes after that, garland chrysanthemum was added and boiled for two minutes to prepare sukiyaki.

(17) Test Examples 39, 40 (Ponzu)

Koikuchi soy sauce (dark-colored soy sauce), seasonings, citrus juice and the like in a composition shown in Table 9 were mixed and dissolved. It was placed in a glass sample bottle, heated in hot water (temperature of a content: kept at 70° C. for 30 seconds after reaching the temperature), stoppered, and cooled with water. Then, it was allowed to stand for 3 days in a refrigerator (5° C.) to prepare a packaged liquid seasoning (Test Example 39) (sodium content: 3.1%, pH=3.9). A sample containing water without hesperidin sugar adduct (αG-hesperidin PA-T) was used as a control (Test Example 40). These were used for cooking (Yudofu, Horenso-no-ohitashi (boiled spinach salad)) and flavor thereof was sensory evaluated based on the evaluation rating of (6) for "evaluation for abnormal taste derived from flavonoid," on the evaluation rating of (14) for "evaluation for taste of soy sauce," and on the following evaluation ratings for others. Results are shown in Table 10. In this experiment, the flavonoid glycoside used in Test Examples 39 was a hesperidin sugar adduct (αG-hesperidin PA-T, Toyo Sugar Reining Co. Ltd., Y/(X+Y)=0.33)

[Evaluation Rating for Refreshing Flavor]

a: There are stronger flavors specific to citrus fruits juice and fresh sour taste of vinegar/citrus fruits juice with no unfavorable stuffy smell and sour taste compared with the control, favorable.

b: There are slightly stronger flavors specific to citrus fruits juice and fresh sour taste of vinegar/citrus fruits juice with no unfavorable stuffy smell and sour taste compared with the control, slightly favorable.

c: There are flavors specific to citrus fruits juice and fresh sour taste of vinegar/citrus fruits juice with some unfavorable stuffy smell and sour taste compared with control.

d: There are equivalent flavors specific to citrus fruits juice and fresh sour taste of vinegar/citrus fruits juice to control.

e: There are reduced flavors specific to citrus fruits juice and fresh sour taste of vinegar/citrus fruits juice compared with control.

[Evaluation Rating for Ripened Flavor]

a: stronger mild ripened flavor in aftertaste compared with control, favorable.

b: slightly stronger mild ripened flavor in aftertaste compared with control, slightly favorable.

c: equivalent mild ripened flavor in aftertaste to control.

d: slightly weaker mild ripened flavor in aftertaste compared with control, slightly unfavorable.

e: weaker mild ripened flavor in aftertaste compared with control, unfavorable.

TABLE 9

Ponzu

| | Test example | |
|---|---|---|
| | 39 | 40 |
| Common salt | 34 | 34 |
| Superfine sugar | 70 | 70 |
| Sodium glutamate | 8 | 8 |
| Disodium inosinate | 0.5 | 0.5 |
| Dashi soup*[1] | 410.5 | 410.5 |
| Koikuchi soy sauce | 273.6 | 273.6 |
| Vineger | 100 | 100 |
| Citrus juice | 100 | 100 |
| αG-hesperidin PA-T | 1.4 | 0 |
| Pure water | 0 | 1.4 |
| Ethanol | 2 | 2 |

*[1]In a pot were placed 412 parts of pure water and 10 parts of kelp, and heated.

When boiled, into the pot was added 10 parts of dried bonito flake, and heated for 5 minutes.

The mixture was filtered through cooking paper. The filtrate was cooled with water and added with pure water so as to be 410.5 parts.

TABLE 10

Ponzu

| Test example 39 | Yudoufu*[2] | Spinash*[3] |
|---|---|---|
| Abnormal taste of flavonoid | a | a |
| Taste of soy saue | a | a |
| Flavor of citrus | a | a |
| Ripened flavor | a | a |
| Comment (Comparison with Test example 40) | Absolutely abnormal taste Weaker taste of soy sauce Stronger citrus flavor Enhanced sour taste Refreshing No unfavorable taste | Absolutely abnormal taste Weaker taste of soy sauce Stronger citrus flavor Enhanced sour taste Refreshing No unfavorable taste |

*[2]Tofu (Kinu) was placed in 600 parts of pure water + 5.5 parts of kelp, heated, and dipped in Ponzu for evaluation.
*[3]commercially available frozen boiled-spinach was thawed and dipped in Ponzu for evaluation.

As shown in Table 9, in Test Example S, there was no abnormal taste derived from flavonoid and reduced taste of soy sauce compared with control, favorable. In particular, Test Example S had enhanced fresh sour taste of vinegar and citrus fruits juice and flavor specific to citrus fruits juice, good refreshing flavor, no unfavorable stuffy smell and sour taste, and thus had good flavor. As thus, it was shown that the present inventive product has significantly excellent flavor.

(18) Test Examples 41 and 42 (Non-Oil Dressing)

Reduced-salt soy sauce, seasonings, etc. in a composition shown in Table 11 were mixed and dissolved. It was placed in glass sample bottles, heated (temperature of a content: reached to 85° C.), transferred into PET containers (500 mL volume), and cooled with water. Then, it was stoppered and allowed to stand for 3 days in a refrigerator (5° C.) to prepare a packaged liquid seasoning (Test Examples 41) (sodium content: 2.0%, pH=4.0) A sample containing water without hesperidin sugar adduct (αG-hesperidin PA-T) was used as a control (Test Examples 42).

(19) Vegetable Salad

On 30 parts of vegetable ingredients described below was poured 7 parts of packaged liquid seasoning (Test Examples 41 and 42) prepared in (18) to prepare a vegetable salad. The prepared vegetable salad was sensory evaluated for flavor. Results are shown in Table 11.

<Ingredient>
cabbage (shredded) 20 parts
cucumber (shredded) 5 parts
carrot (shredded) 5 parts

TABLE 11

Non-oil dreshing

| | Test product | |
|---|---|---|
| | 41 | 42 |
| Grain vinegar(Mitsukan aid degree 4.2%) | 25 | 25 |
| Reduced-salt soy sauce (YAMASA Corporation) | 20 | 20 |
| Superfine sugar | 15 | 15 |
| Sodium glutamate | 1 | 1 |
| Common salt | 3 | 3 |
| Japanese sake (Hakutsuru) | 5 | 5 |
| Paste of onion sautes (Nikken Foods co.Ltd.) | 0.5 | 0.5 |
| αG-hesperidin PA-T | 0.5 | 0 |
| Pure water | 30 | 30.5 |
| Comment | Absolutely abnormal taste Weaker taste of soy sauce No stuffy smell of acid Mild aftertaste Good flavor balance | Absolutely abnormal taste stronger taste of soy sauce Slight stuffy smell of acid Off-balanced flavor |

As shown in Table 11, Test Example X had absolutely no abnormal taste derived from flavonoid, reduced taste of soy sauce, no stuffy smell generated by heating of vinegar, mild aftertaste, and good flavor. In contrast, Test Examples Y had a stronger taste of soy sauce, slight stuffy smell, and off-balanced flavor. As described above, the seasoning containing the flavonoid glycoside had improved flavor.

The invention claimed is:

1. A liquid seasoning, comprising the following (A), (B), and (C):
(A) 0.4 to 8% by mass of sodium
(B) 0.01 to 4% by mass of flavonoid
(C) 1 to 10% by mass of ethanol wherein, the flavonoid (B) satisfies the formula (1) and has one or more OH groups on the A-ring or B-ring in a molecule and no OH group at the position adjacent to the OH group (ortho position):

$$Y/(X+Y)=0.05 \text{ to } 1 \quad \text{formula (1)}$$

wherein, X and Y represent the following numbers, respectively:

X; the number of OH group bonded to benzene rings in a molecule of the flavonoid, Y; the number of $OCH_3$ group bonded to benzene rings in a molecule of the flavonoid.

2. The liquid seasoning according to claim 1, wherein the flavonoid (B) is a flavonoid glycoside.

3. The liquid seasoning according to claim 1, wherein the flavonoid (B) is at least one or more selected from the group consisting of naringin, naringenin, apiin, apigenin, cosmetin, astragalin, kaempferol, morin, narirutin, rhoifolin, acacetin, isorhamnetin, tricine, nobiletin, pectolinarigenin, tangeretin, narcissin, brassidin, diosmin, linaroside, and sinensetin.

4. The liquid seasoning according to claim 1, which is a packaged liquid seasoning.

5. A liquid seasoning, comprising the following (A), (B), (C), and (D):
(A) 0.2 to 8% by mass of sodium
(B) 0.01 to 4% by mass of flavonoid glycoside
(C) 0.2 to 10% by mass of the ethanol
(D) 3.5 to 30% by mass of sugar.

6. A liquid seasoning, comprising the following (A), (B), and (D):
(A) 0.2 to 8% by mass of sodium
(B) 0.01 to 4% by mass of flavonoid glycoside
(D) 3.5 to 30% by mass of sugar of which pH is 2 or more and less than 4.5.

7. The liquid seasoning according to claim 1, further comprising (E) umami seasoning in an amount of 0.1 to 10% by mass.

8. The liquid seasoning according to claim 1, which is one of soy sauce, Tsuyu, and Ponzu.

9. The liquid seasoning according to claim 8, wherein the soy sauce is a reduced-salt soy sauce or a low-salt soy sauce.

10. A method for preparing a food comprising adding the liquid seasoning according to claim 1 to said food.

11. The liquid seasoning according to claim 5, further comprising (E) umami seasoning in an amount of 0.1 to 10% by mass.

12. The liquid seasoning according to claim 5, which is one of soy sauce, Tsuyu, and Ponzu.

13. The liquid seasoning according to claim 12, wherein the soy sauce is a reduced-salt soy sauce or a low-salt soy sauce.

14. A method for preparing a food comprising adding the liquid seasoning according to claim 5 to said food.

15. The liquid seasoning according to claim 6, further comprising (E) umami seasoning in an amount of 0.1 to 10% by mass.

16. The liquid seasoning according to claim 6, which is one of soy sauce, Tsuyu, and Ponzu.

17. The liquid seasoning according to claim 16, wherein the soy sauce is a reduced-salt soy sauce or a low-salt soy sauce.

18. The liquid seasoning according to claim 1, wherein the content of (B) flavonoid is 0.06 to 2% by mass.

19. The liquid seasoning according to claim 1, wherein the content of (B) flavonoid glycoside is 0.06 to 2% by mass.

20. The liquid seasoning according to claim 1, wherein the content of (B) flavonoid glycoside is 0.06 to 2% by mass.

* * * * *